United States Patent
Zhong

(10) Patent No.: US 9,964,826 B2
(45) Date of Patent: May 8, 2018

(54) LIQUID CRYSTAL DISPLAY DEVICE BEING SWITCHABLE BETWEEN TRANSMISSION MODE AND REFLECTION MODE AND DISPLAY MODULE THEREOF

(71) Applicant: Wuhan China Star Optoelectronics Technology Co., Ltd., Wuhan, Hubei (CN)

(72) Inventor: Xinhui Zhong, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 21 days.

(21) Appl. No.: 15/186,464

(22) Filed: Jun. 18, 2016

(65) Prior Publication Data
US 2017/0307914 A1 Oct. 26, 2017

(30) Foreign Application Priority Data
Apr. 20, 2016 (CN) .......................... 2016 1 0249964

(51) Int. Cl.
*G02F 1/137* (2006.01)
*G02F 1/1335* (2006.01)
*G02F 1/1343* (2006.01)
*G02F 1/1333* (2006.01)
*G02F 1/133* (2006.01)

(52) U.S. Cl.
CPC .......... *G02F 1/137* (2013.01); *G02F 1/13306* (2013.01); *G02F 1/133345* (2013.01); *G02F 1/133528* (2013.01); *G02F 1/133555* (2013.01); *G02F 1/134309* (2013.01); *G02F 2201/05* (2013.01); *G02F 2203/09* (2013.01)

(58) Field of Classification Search
None
See application file for complete search history.

(56) References Cited

U.S. PATENT DOCUMENTS

| | | | |
|---|---|---|---|
| 2008/0158488 A1* | 7/2008 | Yanai | G02F 1/133371 349/107 |
| 2014/0184984 A1* | 7/2014 | Kim | G02F 1/1334 349/61 |
| 2017/0124984 A1* | 5/2017 | Wang | G09G 5/10 |

* cited by examiner

*Primary Examiner* — Ashok Patel
(74) *Attorney, Agent, or Firm* — Andrew C. Cheng

(57) ABSTRACT

The present disclosure provides a transflective switchable liquid crystal display device and its display module. The liquid crystal display module includes a liquid crystal unit and a transflector driving unit arranged in this order; wherein the transflective driving unit further includes a first substrate, a first electrode layer arranged on the first substrate, a first liquid layer arranged on the first electrode layer, and a second liquid layer surrounding and covering the first liquid layer. The spreading and shrinking state of the first liquid layer are changed by controlling the voltage of the first electrode layer, and the transmissive mode and the reflective mode of the liquid crystal display module are switched. The liquid crystal display module enables the liquid crystal display to have a high opening, a high penetration, or a highly reflective display in both the transmission mode and the reflection mode.

10 Claims, 4 Drawing Sheets

LIQUID CRYSTAL DISPLAY DEVICE BEING SWITCHABLE BETWEEN TRANSMISSION MODE AND REFLECTION MODE AND DISPLAY MODULE THEREOF

FIELD OF THE DISCLOSURE

The present disclosure relates to a liquid crystal display device field, and more particularly to a liquid crystal display device being switchable between transmission mode and reflection mode and a display module thereof.

BACKGROUND OF THE DISCLOSURE

To make an LCD in the low ambient illumination of indoor and the high ambient illumination of outdoor has a good display quality, a transflective LCD has been invented, and the transflective LCD divides the space of the display area of the pixel to a transmissive portion and a reflective portion, generally, by using the transmission mode in the low ambient illumination of indoor and using the reflection mode or the transflective mode in the high ambient illumination of outdoor. But there is a major problem in the transflective LCD. Since the reflective electrode of the pixel reflection region is not transparent, the proportion of the area of the transmissive display region is decreased, and the light transmittance in the transmissive mode is very low.

SUMMARY OF THE DISCLOSURE

The embodiment of the present disclosure provides a liquid crystal display device being switchable between transmission mode and reflection mode and a display module thereof to solve the technical problem of low light transmittance in the transmissive mode of the transflective liquid crystal display in the prior art.

In order to solve the above problem, the embodiment of the present disclosure provides a liquid crystal display module being switchable between transmission mode and reflection mode, wherein the liquid crystal display module includes a liquid crystal unit and a transflective driving unit arranged in an overlapped mode; and the transflective driving unit further includes:

a first substrate;

a first pair of electrode layers arranged on the first substrate;

a first liquid layer arranged between the first pair of electrode layers; wherein the first liquid layer changes its spreading and shrinking state under the action of the electric field and has high reflection on the light;

a second liquid layer surrounding and covering the first liquid layer; wherein the first liquid layer is immiscible with the second liquid layer;

wherein the spreading and shrinking state of the first liquid layer are changed by controlling the voltage of the first pair of electrode layers to achieve the switching between the transmission mode and the reflection mode of the liquid crystal display module.

According to the preferred embodiment of the present disclosure, it further arranges an insulating layer between the first liquid layer and the first electrode layer, and the insulating layer has a characteristic similar to the first liquid layer.

According to the preferred embodiment of the present disclosure, a part of the first pair of electrode layers is arranged corresponding to the first liquid layer, so that the first liquid layer driven by the voltage of the first pair of electrode layers can shrink to the non-corresponding position of the first electrode layer.

According to the preferred embodiment of the present disclosure, it also provides a block disposed at both ends of the first liquid layer, the block has a characteristic similar to the second liquid layer.

According to the preferred embodiment of the present disclosure, the second liquid layer is transparent liquid.

According to the preferred embodiment of the present disclosure, the second liquid layer is water.

According to the preferred embodiment of the present disclosure, the first liquid layer is an oil layer containing a white pigment.

According to the preferred embodiment of the present disclosure, the liquid crystal display module further comprises a second substrate and a third substrate, a second electrode layer and a third electrode layer arranged on opposite sides of the second substrate and the third substrate, a liquid crystal layer disposed between the second electrode layer and the third electrode layer, wherein the second electrode layer and the third electrode layer are used to drive the deflection of the liquid crystal in the liquid crystal layer.

According to the preferred embodiment of the present disclosure, the liquid crystal display module further comprises a first polarizer and a second polarizer arranged outside of the third substrate and the first substrate respectively.

In order to solve the above technical problem, the present disclosure further provides a liquid crystal display device being switchable between transmission mode and reflection mode including the liquid crystal display module of any one of above embodiment described.

In contrast to the prior art, the present disclosure provides a transflective mode switchable liquid crystal display and a display module thereof. The transmission mode and the reflection mode of the liquid crystal display are switched by the state in which the electrode is driven to spread and contract the liquid. The liquid crystal display is also provided with a high opening, a high penetration, or a high reflection in both the transmission mode and the reflection mode.

BRIEF DESCRIPTION OF THE DRAWINGS

In order to more clearly illustrate the technical solution in the embodiments of the present disclosure, the drawings to be used in the description of the examples will be briefly described below, and it will be apparent that the drawings in the following description are merely exemplary of the disclosure and that other drawings may be obtained by those skilled in the art without departing from the inventive work.

DETAILED DESCRIPTION OF PREFERRED EMBODIMENTS

The disclosure will now be described in further detail with reference to the accompanying drawings and examples. It is specifically pointed out that the following examples are merely illustrative of the disclosure, but are not intended to limit the scope of the disclosure. Likewise, the following examples are merely part of the present disclosure and not all embodiments, and all other embodiments obtained by one of ordinary skill in the art without making creative work are within the scope of the present disclosure.

Figure 1:
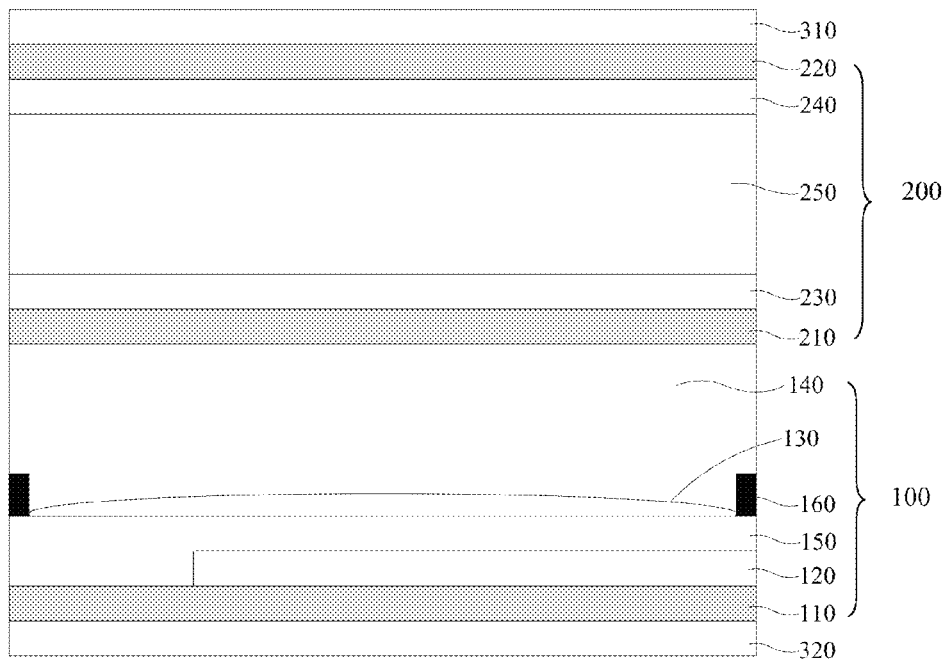
FIG. 1 is a schematic structure view of the preferred embodiment of the liquid crystal display module switchable between transmission mode and reflection mode of the present disclosure.

Please refer to FIG. 1, FIG. 1 is a schematic structure view of the preferred embodiment of the liquid crystal display module being switchable between transmission mode and reflection mode of the present disclosure, and the liquid crystal display module includes but not limited a liquid crystal unit 200 and a transflective driving unit 100 arranged in an overlapped mode.

In particular, the transflective driving unit 100 includes a first substrate 110, a first pair of electrode layers 120, a first liquid layer 130, a second liquid layer 140, an insulating layer 150 and a block 160.

The first electrode layer 120 is arranged on the first substrate 110. The first electrode layer 120 is arranged on an insulating layer 150. Preferably, the insulating layer 150 has the characteristics similar to the first liquid layer 130 so that the first liquid layer 130 can be well developed when the first electrode layer 120 is not applied with a voltage. The first liquid layer 130 is arranged on the insulating layer 150. The first liquid layer 130 can change its spreading and shrinking state under the action of the electric field and has high reflection on the light. Preferably, the first liquid layer 130 is an oil layer containing a white pigment. The material can function well against light, and it is also possible to change the spreading state by the electric field of the first electrode layer 120.

In the above-mentioned embodiment, the first electrode layer 120 is preferably arranged partially corresponding to the first liquid layer 130 so that the first liquid layer 130 can be contracted to a position not corresponding to the first electrode layer 120 by the voltage driving of the first electrode layer 120. Its specific drive principle and process is shown in the follow-up content in detail.

The second liquid layer 140 surrounds and covers the first liquid layer 130, and the first liquid layer 130 is immiscible with the second liquid layer 140. Preferably, the second liquid layer 140 is transparent liquid, more preferably is water. The block 160 is arranged at both ends of the first liquid layer 130, and the block 160 has a characteristics similar to the second liquid layer 140, i.e. Hydrophilic. The embodiment of the present disclosure is characterized in that the spread and contraction state of the first liquid layer 130 is changed by controlling the voltage of the first electrode layer 120, thereby realizing the switching mode of the liquid crystal display module transmission mode and the reflection mode.

The liquid crystal unit 200 includes a second substrate 210, a third substrate 220, a second electrode layer 230 and a third electrode layer 240 respectively arranged on the opposite sides of the second substrate 210 and the third substrate 220, a liquid crystal layer 250 sandwiched between the second electrode layer 230 and the third electrode layer 240. The second electrode layer 230 and the third electrode layer 240 are used to drive the deflection of the liquid crystal in the liquid crystal layer 250. The liquid crystal layer 250 is aligned in a vertically aligned form.

Further, the liquid crystal display module further includes a first polarizer 310 and a second polarizer 320, and the first polarizer 310 and the second polarizer 320 are arranged outside of the third substrate 220 and the first substrate 110 respectively.

It is to be noted that the electrode layer, the substrate, the insulating layer, and the like in the present embodiment are made of a transparent material so that light can pass therethrough.

The following control method and principle of the present disclosure will be described in detail.

The reflection mode and the transmission mode switching scheme are as follows: the spreading and contraction of the first liquid layer 130 in the transflective driving unit 100 controlled by applying a voltage through the first electrode layer 120. When the first electrode layer 120 does not apply a voltage, the first liquid layer 130 is spread, since the first liquid layer 130 contains a white pigment and has a good reflection effect on the light, it is a reflective layer, and the state display is a reflection mode; when the voltage is applied to the first electrode layer 120, the first liquid layer 130 is contracted and the display is in the transmission mode.

Figure 2:
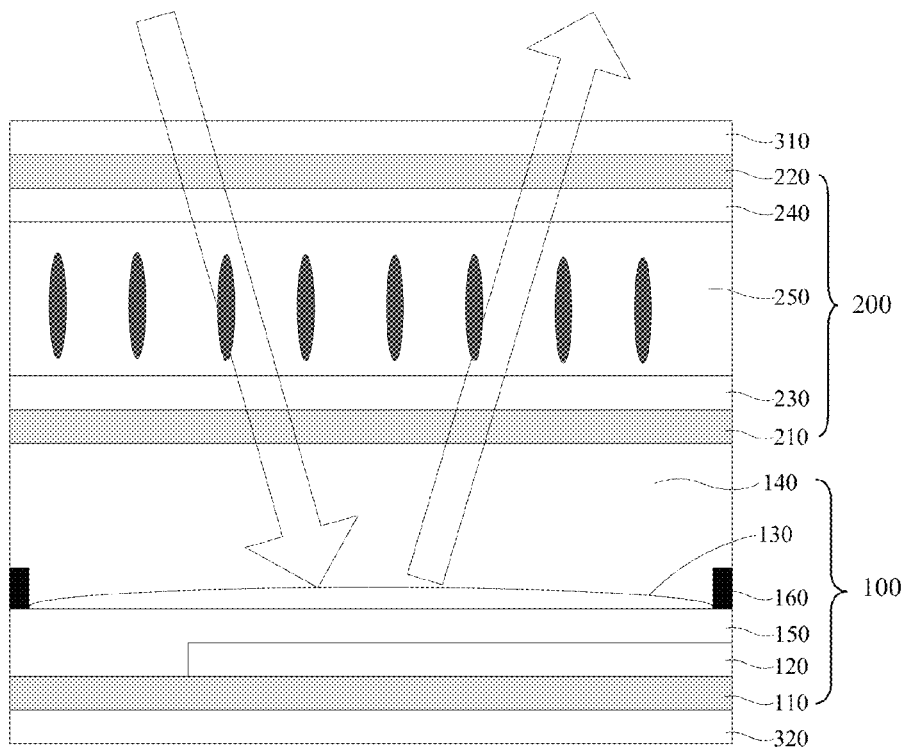
FIG. 2 is a schematic view of the optical path of the reflective mode of the liquid crystal display module as in a bright state in the embodiment of FIG. 1.
Figure 3:
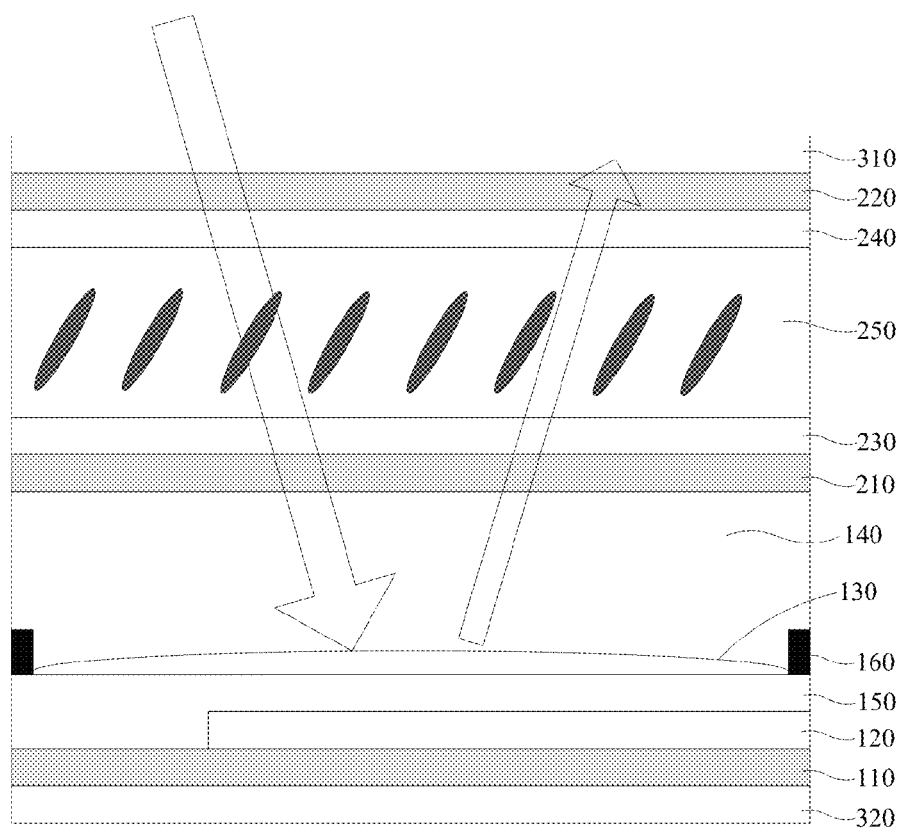
FIG. 3 is a schematic view of the optical path of the reflective mode of the liquid crystal display module as in a dark state in the embodiment of FIG. 1.

The reflective mode display principle is listed as follows with reference to FIG. 2 and FIG. 3. FIG. 2 is a schematic view of an optical path in which the reflective mode of the liquid crystal display module is in a bright state in the embodiment of FIG. 1. FIG. 3 is a schematic diagram of an optical path in which the reflection mode of the liquid crystal display module is dark state in the embodiment of FIG. 1. The first electrode layer 120 remains in the closed state, and the first liquid layer 130 in the transflective driving unit 100 is in spreading state. The liquid crystal in the liquid crystal unit 200 is rotated by the voltage difference between the pair of electrodes formed by controlling the second electrode layer 230 and the third electrode layer 240 to control the level of the light reflectance. When the voltage difference between the second electrode layer 230 and the third electrode layer 240 is 0, the liquid crystal molecules are vertically aligned, and the ambient light is incident on the liquid crystal unit 200 through the first polarizer 310. The liquid crystal layer 250 does not affect the light generation polarization state. Reflected by the first liquid layer 130 may pass through the first polarizer 310, the liquid crystal display is shown as bright state. When a certain voltage difference is applied between the second electrode layer 230 and the third electrode layer 240, the liquid crystal molecules are rotated to cause the incident light and the reflected light to undergo a polarization transition to achieve a low light reflectance state, i.e. the dark state of the reflection mode. The arrows in the figure indicate the propagation path of the light in the environment.

Figure 4:
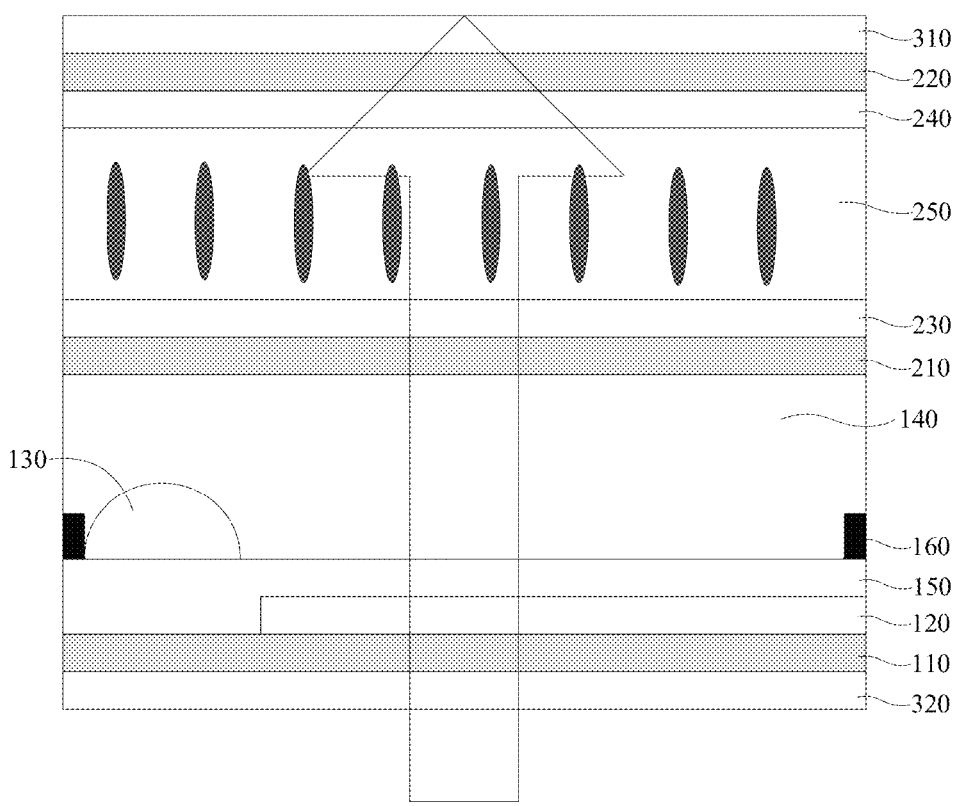
FIG. 4 is a schematic view of the optical path of the transmissive mode of the liquid crystal display module as in a dark state in the embodiment of FIG. 1.
Figure 5:
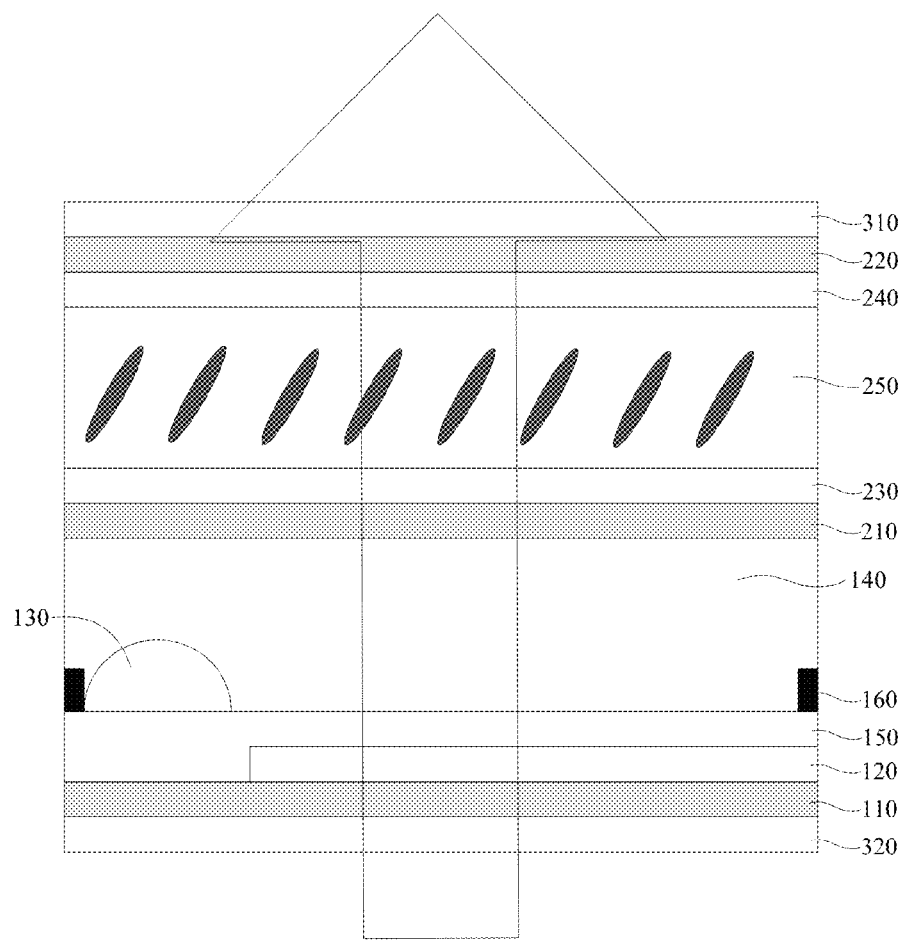
FIG. 5 is a schematic view of the optical path of the transmissive mode of the liquid crystal display module as a bright state in the embodiment of FIG. 1.

The transmission mode display principle is listed as follows with reference to FIG. 4 and FIG. 5. FIG. 4 is a schematic diagram of an optical path in which the transmission mode of the liquid crystal display module is dark state in the embodiment of FIG. 1. FIG. 5 is a schematic view of the optical path in which the transmission mode of the liquid crystal display module is in the bright state in the embodiment of FIG. 1. The first electrode layer 120 is kept in an open state, and the first liquid layer 130 in the transflective driving unit 100 is in a contraction state. At this time, the liquid crystal display performance as a transmissive display.

The liquid crystal in the liquid crystal unit 200 is rotated by controlling the voltage difference between the pair of electrodes formed by the second electrode layer 230 and the third electrode layer 240 to control the passing rate of the backlight. When the voltage difference between the second electrode layer 230 and the third electrode layer 240 is 0, the liquid crystal molecules are vertically arranged, and the backlight is incident on the liquid crystal unit 200 through the second polarizer 320, the liquid crystal layer 250 does not cause a polarization effect on the light, due to the presence of the first polarizer 310, the emitted light is less, and the liquid crystal display is present as a dark state; when a certain voltage difference is applied between the second electrode layer 230 and the third electrode layer 240, the liquid crystal molecules are rotated. It is possible to change the polarization state of the backlight light incident on the second polarizer 320 so as to achieve the same purpose as the polarization direction of the first polarizer 310, thereby increasing the passing rate of the backlight light and exhibiting the liquid crystal display as a bright state. The arrows in the figure indicate the propagation path of the backlight.

Figure 6:
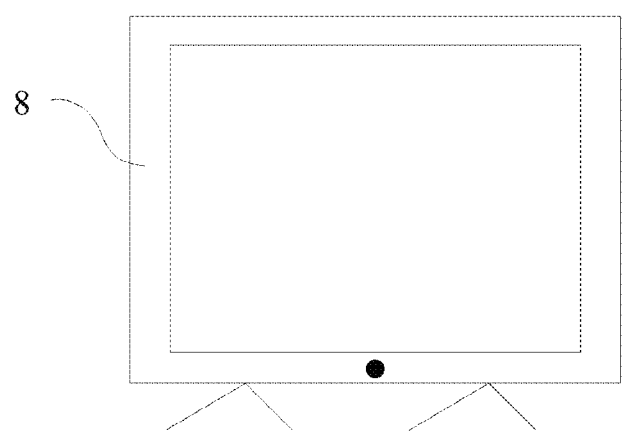
FIG. 6 is a schematic structure view of the preferred embodiment of the liquid crystal display device switchable between transmission mode and reflection mode of the present disclosure.

In addition, embodiments of the present disclosure also provide a transflective switchable liquid crystal display device, please refer to FIG. 6. FIG. 6 is a schematic view of a preferred embodiment of the transflective switchable liquid crystal display device of the present disclosure. Wherein the liquid crystal display includes a housing 8 and a liquid crystal display module in the above-described embodiment arranged inside the housing 8. Technical features of the liquid crystal display module please refer to the detailed description in the above embodiments, and other structural features of the liquid crystal display are not to be described in the knowledge of those skilled in the art.

Compared to the prior art, the liquid crystal display device being switchable between transmission mode and reflection mode and the display module thereof are provided by the disclosure, and the transmission mode and the reflection mode of the liquid crystal display are realized by the state of spreading and contracting the electrode driving liquid, and the liquid crystal display is also provided with a high opening, a high penetration, or a high reflection in both the transmission mode and the reflection mode.

The foregoing is merely a partial embodiment of the present disclosure and is not intended to limit the scope of the disclosure, and is by way of equivalent means or equivalent process transformation made by the description of the disclosure and the accompanying drawings, or directly or indirectly employed in other related technical fields, are likewise included within the scope of the patent protection of the present disclosure.

What is claimed is:

1. A liquid crystal display module being switchable between a transmission mode and a reflection mode, wherein, the liquid crystal display module comprises a liquid crystal unit and a transflective driving unit arranged in an overlapped mode; the transflective driving unit further comprises:

a first substrate;
a first pair of electrode layers arranged on the first substrate;
a first liquid layer disposed between the first pair of electrode layers; wherein the first liquid layer changes its spreading and shrinking state under the action of the electric field and has high reflection on the light;
a second liquid layer surrounding and covering the first liquid layer; wherein the first liquid layer is immiscible with the second liquid layer;
wherein the spreading and shrinking state of the first liquid layer are changed by controlling the voltage of the first pair of electrode layers to achieve the switching between the transmission mode and the reflection mode of the liquid crystal display module.

2. The liquid crystal display module according to claim 1, further comprising an insulating layer disposed between the first liquid layer and the first pair of electrode layers, and the insulating layer having a characteristic similar to the first liquid layer.

3. The liquid crystal display module according to claim 2, wherein a part of the first pair of electrode layers is arranged corresponding to the first liquid layer, so that the first liquid layer driven by the voltage of the first pair of electrode layers can shrink to the non-corresponding position of the first pair of electrode layers.

4. The liquid crystal display module according to claim 1, further comprising a block disposed at both ends of the first liquid layer, wherein the block has a characteristic similar to the second liquid layer.

5. The liquid crystal display module according to claim 1, wherein, the second liquid layer is transparent liquid.

6. The liquid crystal display module according to claim 5, wherein, the second liquid layer is water.

7. The liquid crystal display module according to claim 1, wherein, the first liquid layer is an oil layer containing a white pigment.

8. The liquid crystal display module according to claim 1, wherein, the liquid crystal display module further comprises a second substrate and a third substrate, the corresponding sides of the second substrate and the third substrate is arranged a second electrode layer and a third electrode layer respectively, a liquid crystal layer is arranged between the second electrode layer and the third electrode layer, the second electrode layer and the third electrode layer are used to drive the deflection of the liquid crystal in the liquid crystal layer.

9. The liquid crystal display module according to claim 8, wherein, the liquid crystal display module further comprises a first polarizer and a second polarizer arranged outside of the third substrate and the first substrate respectively.

10. A liquid crystal display device being switchable between transmission mode and reflection mode, wherein, the liquid crystal display device comprises the liquid crystal display module as claimed in claim 1.

* * * * *